United States Patent [19]

Terashita

[11] Patent Number: 5,227,837
[45] Date of Patent: Jul. 13, 1993

[54] PHOTOGRAPH PRINTING METHOD

[75] Inventor: Takaaki Terashita, Kanagawa, Japan

[73] Assignee: Fuji Photo Film Co., Ltd., Kanagawa, Japan

[21] Appl. No.: 522,029

[22] Filed: May 11, 1990

[30] Foreign Application Priority Data

| May 12, 1989 [JP] | Japan | 1-119183 |
| Jul. 13, 1989 [JP] | Japan | 1-181443 |
| Jul. 25, 1989 [JP] | Japan | 1-191765 |

[51] Int. Cl.$^5$ .................... G03B 27/80; G03B 17/24
[52] U.S. Cl. ........................................ 355/38; 354/109
[58] Field of Search .............. 355/38, 68, 41, 77, 355/40; 354/21, 105–109

[56] References Cited

U.S. PATENT DOCUMENTS

| 4,168,121 | 9/1979 | Freier et al. | 355/38 |
| 4,299,479 | 11/1981 | Harvey et al. | 355/38 |
| 4,707,119 | 11/1987 | Terashita | 355/38 |
| 4,862,200 | 8/1989 | Hicks | 354/105 |
| 4,965,627 | 10/1990 | Robison | 355/40 |
| 5,016,039 | 5/1991 | Sosa et al. | 354/105 X |

FOREIGN PATENT DOCUMENTS

| 51-117632 | 10/1976 | Japan. |
| 52-13333 | 2/1977 | Japan. |
| 62-189456 | 8/1987 | Japan. |

Primary Examiner—L. T. Hix
Assistant Examiner—D. Rutledge
Attorney, Agent, or Firm—Sughrue, Mion, Zinn, Macpeak & Seas

[57] ABSTRACT

Object brightness color information is recorded on a recording medium such as a photographic film at the time of taking an object image. In making a photoprint, the brightness information or color information is read from the photographic film, and is used for the calculation of a print exposure amount. The brightness information is used to convert photometric values at respective measurement points within a frame into brightness information. The color information is used to obtain the actual color of an object at respective measurement points. In one embodiment, effective measurement points are determined in accordance with the value of brightness information at respective measurement points, and characteristic values to be used for the calculation of a print exposure amount are derived by using the effective measurement points. In another embodiment, scene type is judged in accordance with the maximum value of the brightness information, and the print exposure amount is determined in accordance with the judged scene type. In yet another embodiment, scene type information is recorded on a photographic film, the scene type being discriminated in accordance with brightness values obtained by measuring the scene at respective divisional areas. To make a photoprint, the scene type information is read to determine a print exposure amount for the discriminated scene. In still another embodiment, the information representative of luminance values obtained through divisional area photometry, and an average luminance of a scene is recorded in a photographic film. A print exposure amount is determined by using the recorded luminance difference.

21 Claims, 10 Drawing Sheets

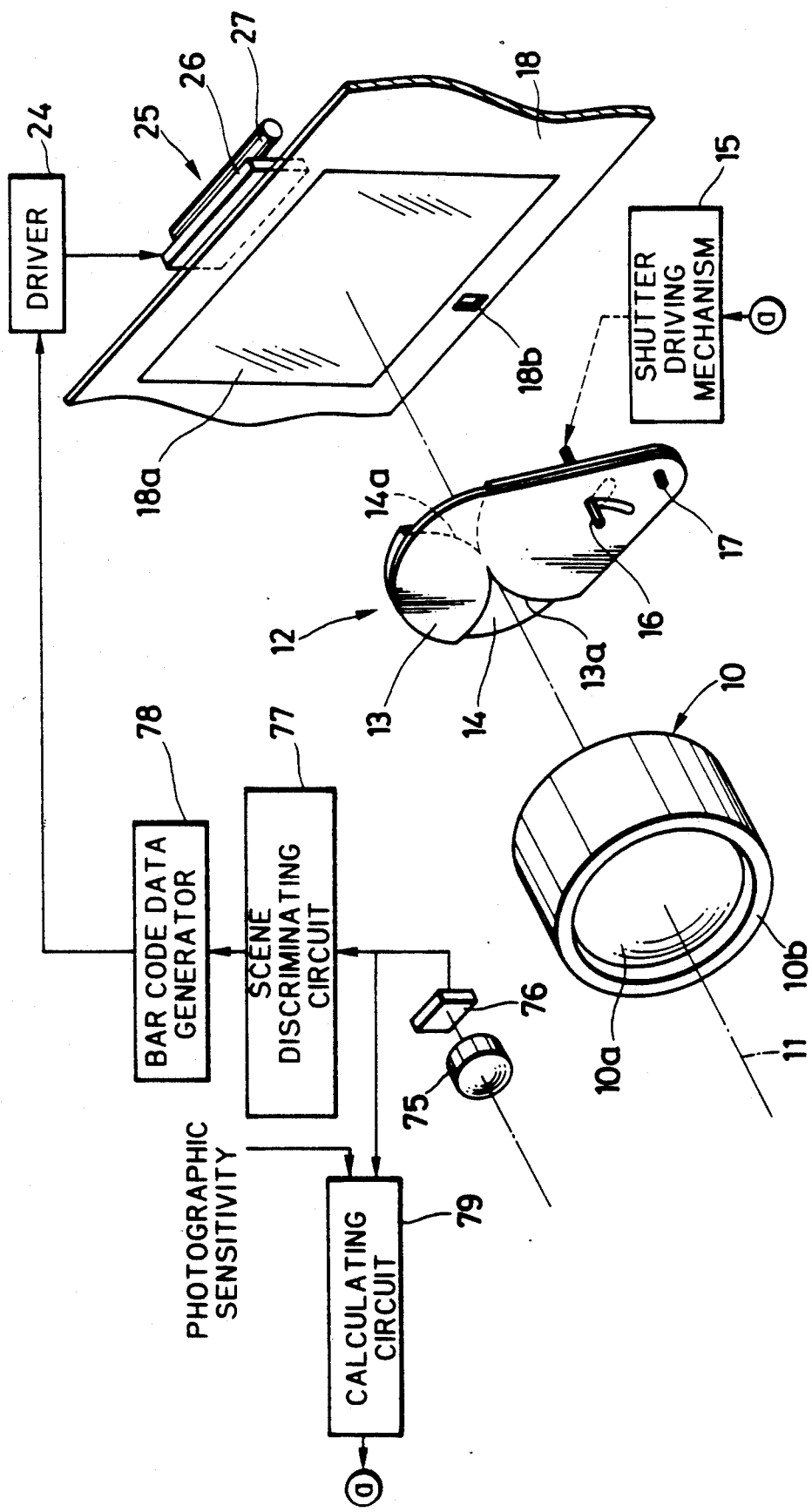

F I G. 9
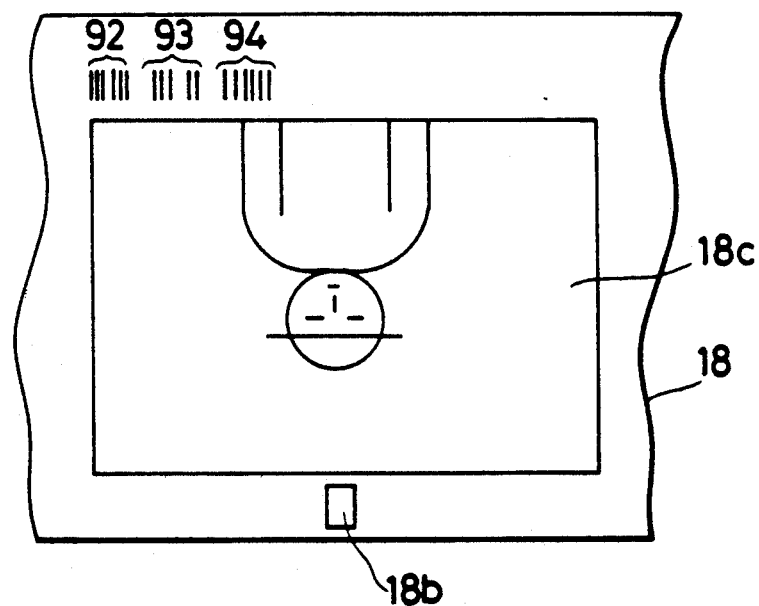

PHOTOGRAPH PRINTING METHOD

BACKGROUND OF THE INVENTION

The present invention relates to a photograph printing method, and more particularly to a photograph printing method in which a print exposure amount is determined in accordance with object information recorded on a recording medium, such as photographic film, when taking an object image, the object information including brightness information, average color information, scene classification information, and the like, of an object (subject).

In making photoprints, the print exposure amount for each of three primary colors (red, green, and blue) is determined in accordance with a measured average density of the overall area of a frame image recorded on a photograph film. This exposure control is called an LATD (Large Area Transmittance Density) method, by which the print exposure amount for each color is determined so as to obtain a finished photoprint of which integration of the three primary colors yields an appropriate grey scale tone.

With this LATD method, a frame having a scene of one-sided density or color results in an improperly finished principal image. Therefore, a print exposure amount determined by the LATD method is corrected by classifying a frame scene in accordance with characteristic values such as maximum and minimum transmittance densities, and calculating a correction amount by using a calculation equation prepared for each scene.

A camera shutter and aperture are controlled in accordance with object brightness, so that an image of the object is recorded on the photographic film with proper density. The density of an image recorded on photographic film does not allow discrimination among photographing times, such as night, evening, and daytime, or among photographing locations, such as outdoor and indoor. For instance, a scene taken in the setting sun is judged as a rear light scene, so as to reduce a print exposure amount. As a result, such a scene cannot be reproduced properly. It also is not possible to discriminate between a scene with fireworks and an underexposed scene, resulting in improper printing of a scene with fireworks. A scene with a dark background, such as a scene taken with a flash, results in under-exposure of the principal object.

The color of an image recorded in a photographic film may change greatly depending upon film age, object condition, and photographing condition (e.g. type of illuminating light, reciprocity law failure of photographic film). Depending on these conditions, a frame image can result in a photoprint having poor color balance if print exposure control is conducted by the LATD method. The color of an image recorded on photographic film also changes with the coloring property and the color of its base.

To deal with the foregoing problem, there is a known method in which color is corrected in accordance with film type information provided prior to printing. In addition, in view of the above-described various problems, there is a proposed camera of the type in which a property of illuminating light also is taken as a spot image in an area near a frame (Japanese Patent Laid-open Publication No. 51-117632). The spot image recorded in a photographic film is subjected to photometry to determine a print exposure amount. Another method also has been proposed (in Japanese Patent Laid-open Publication No. 52-13333) in which light entering through an optical wedge from a main illuminating light source illuminating an object is taken in an area between frames, the density in this exposed area is measured, and a print exposure amount for each of the three colors is determined so that the area will be reproduced as an achromatic color or reference color on a photosensitive material.

The above methods both detect a scene illuminating light recorded on the photographic film and determine a print exposure amount such that the illuminating light exposed area on a negative film will be reproduced as a grey color on a photosensitive material. However, it is difficult for these methods to record only the scene illuminating light on photographic film without the influence of light reflected from an object. For instance, for a scene where a human figure in red clothing stands on a lawn and for a scene with solid colors such as a sea or a mountain under a clear sky, the color of an object differs from an original color, if a photoprint is made by using a print exposure amount determined such that the illuminating light recorded in a photographic film will become a grey color on a photosensitive material.

SUMMARY OF THE INVENTION

In view of the foregoing, it is a principal object of the present invention to provide a photograph printing method capable of determining a proper exposure amount for each type of scene.

It is another object of the invention to provide a photograph printing method capable of discriminating a scene of a frame and identifying an unnecessary area for exposure control respectively at high precision.

It is a further object of the invention to provide a photograph printing method capable of reproducing the color of an object with high fidelity.

The above and other objects and advantages of the invention are achieved by reading the brightness information of an object recorded at the time of taking the object image, judging the scene type from the read brightness information, and determining a print exposure amount by using a particular algorithm such as a calculation equation prepared for each scene type. The brightness information indicates the brightness of an object and may be a luminance value (BV), a light value (LV), or an exposure value (EV). The brightness information may be information representative of one of a plurality of levels of object brightness. The object brightness may be measured through large area photometry, spot photometry, divisional area photometry, multi-point photometry with an image sensor, or the like.

The average brightness may be used in two different ways to calculate a print exposure amount. One way is to convert photometric values of respective points within a frame into brightness when considering the average brightness, to pick up as effective measurement points the measurement points whose brightness is within a predetermined range, and to derive characteristic values for use in calculating the print exposure amount from the photometric values of the effective measurement points. The second way is to pick up the maximum brightness value among respective measurement points. This brightness value is obtained by converting photometric values at respective measurement points while considering the average brightness, judging the scene type in accordance with the maximum value, and determining the print exposure amount by using a calculation algorithm corresponding to the judged scene type.

According to one preferred embodiment of this invention, the scene classification information recorded on the recording material at the time of taking an object image is read for the printing operation to determine a print exposure amount. According to another embodiment, a difference between an average luminance of an object and a luminance used for exposure control is used to determine the print exposure amount.

According to another embodiment, the print exposure amount is determined by using average color information of an object recorded at the time of taking the object image. The color information may be used in various manners for making a photoprint. It is preferable to control the print exposure amount for each of the three colors so that an object and the same area on a reproduced image thereof are the same color.

For exposure control whereby a flesh portion. e.g., a face of a figure recorded in a photographic film is intended to be reproduced as an actual flesh color, it is necessary to detect correctly the flesh color portion recorded in a photographic film. According to this method, the flesh color is defined previously, and it is determined whether each pixel color is included in the defined flesh color range, thereby to identify the flesh color area.

The flesh color recorded on photographic film changes with the type and age of photographic film, and on the illumination condition of an object. As a result, it is difficult to detect flesh color area with high precision. In such a case, each pixel color is corrected by using the recorded color information, and it is determined whether the corrected color is included within the defined flesh color range, so as to allow highly precise detection of flesh color area.

According to a recording apparatus of this invention, an object is subjected to photometry at various divisional areas at the time of taking the object image, and the obtained photometric values at respective divisional areas are used for scene discrimination. This scene type information is recorded, e.g., in a photographic film. According to another embodiment, the photometric values at divisional areas are used to obtain an average luminance of an object and a scene luminance for use with exposure control. The information of the luminance difference therebetween is recorded on a recording medium.

According to the invention, the brightness of an object is estimated by using the brightness information recorded at the time of taking the object image. As a result, it is possible to discriminate correctly those measurement points which are unnecessary for scene discrimination or exposure control, thereby realizing highly precise exposure control. An object is subjected to photometry at divisional areas at the time of taking the object image, and the obtained photometric values at divisional areas are used in discriminating the type of recorded scene. This scene information is recorded and used for the calculation of a print exposure amount, thereby allowing correct scene discrimination. Further, the exposure correction amount at the time of taking an object image is recorded so that the brightness of the object can be estimated at the time of printing, thereby realizing the recorded scene correctly By using the color information of an object, the color of a reproduced photoprint can be made to be the same as the object.

BRIEF DESCRIPTION OF THE DRAWINGS

The foregoing and other objects features, and advantages of the invention will become apparent from the following detailed description when read in connection with the accompanying drawings, in which:

FIG. 6 is a schematic diagram showing an example of a photographic camera which records classification information of a photographic scene.

FIG. 9 shows an example of a photographic film recorded with an image taken with the photographic camera shown in FIG. 8.

DETAILED DESCRIPTION OF THE PREFERRED EMBODIMENTS

Figure 1:
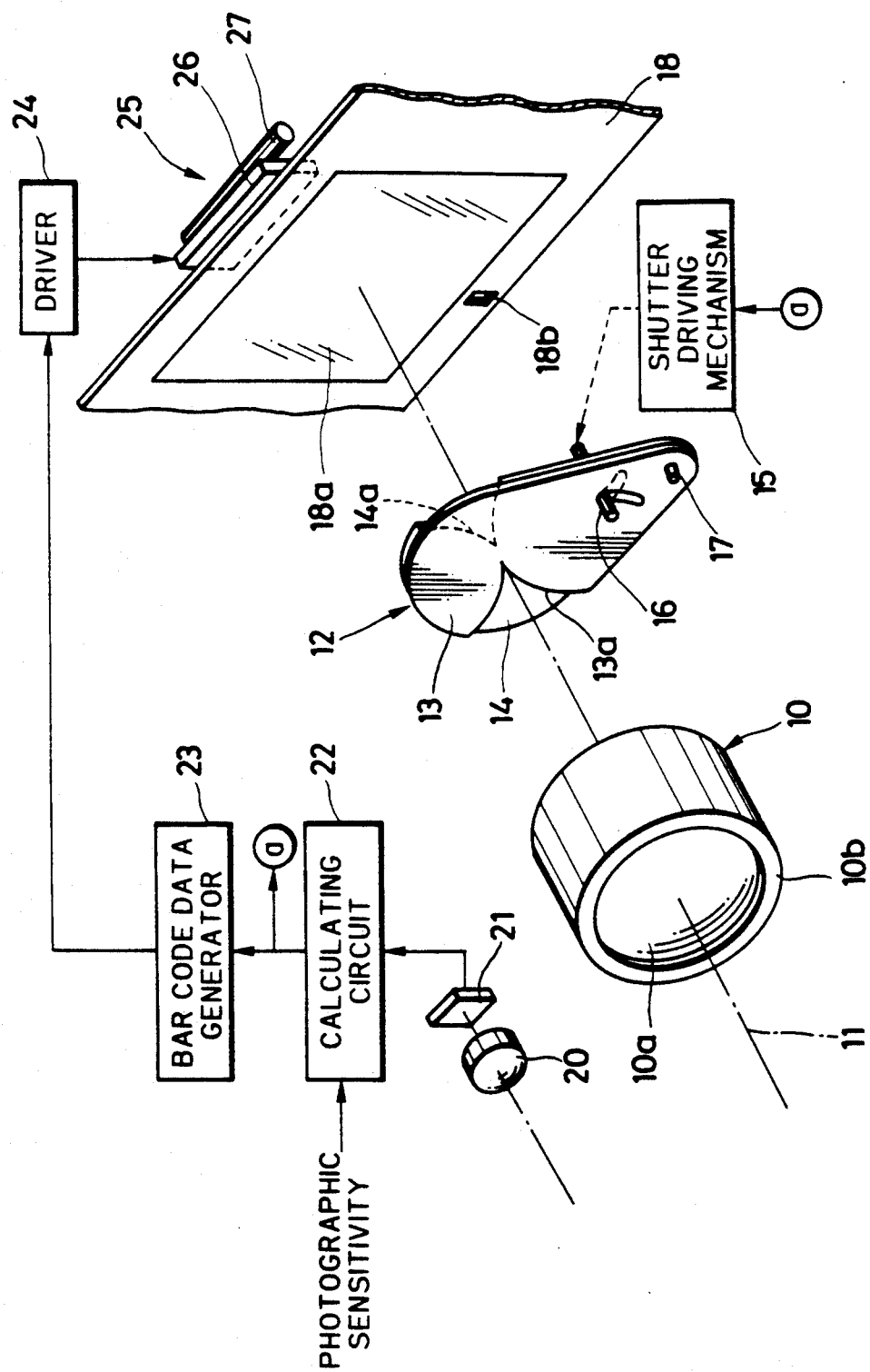
FIG. 1 is a schematic diagram showing an example of a photographic camera for recording brightness information of an object.

FIG. 1 is a schematic diagram showing a photographic camera which records object brightness information. A taking lens 10 is constructed of an optical system 10a. and a lens barrel 10b for holding the optical system 10a. The taking lens 10 is moved along an optical axis 11 by means of a manual or automatic focussing mechanism to adjust a focal length thereof. A shutter 12. constructed of, e.g., two shutter blades 13, 14, is disposed behind the taking lens 10. Recesses 13a, 14a are formed in the shutter blades 13, 14, respectively. The shutter blades 13, 14 are moved by a shutter driving mechanism 15 so as to be pivoted in opposite directions about a fixed pin 17, while a movable pin 16 is moved toward the fixed pin 17 to make an aperture where the recesses 13a, 14a are superposed one upon another. Light passing through this aperture becomes incident on a photographic film 18 to photograph the object.

A photosensor 21 for measuring the brightness of an object is disposed behind a lens 20. An output signal from the photosensor 21 is sent to a calculating circuit 22, which obtains a light value (LV) using the output signal and a photographic sensitivity. This light value is sent, as brightness information, to the drive mechanism 15 to program-control the shutter 12. The light value also is sent to a bar code data generator 23 and is converted into bar code data. A driver 24 drives a bar code recording head 25 to record the brightness information as a bar code on the photographic film 18. In this embodiment, the bar code recording head 25 is constructed of a liquid crystal display 26. At the same time as, or slightly before or after the object is photographed, the brightness information is recorded at an area between a frame 18a and the edge of the film 18.

Figure 2:
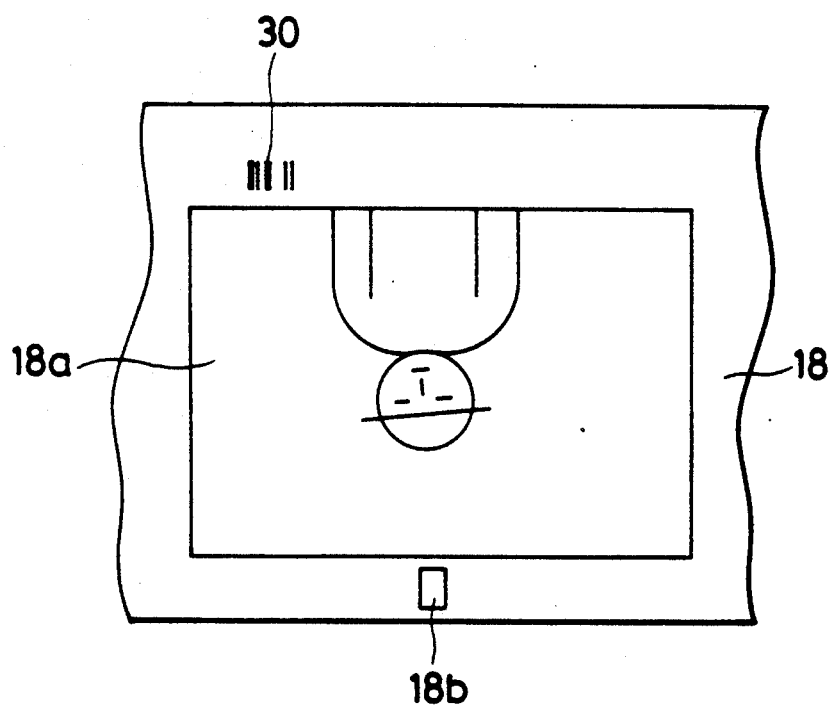
FIG. 2 shows an example of a photographic film recorded with an image taken with the photographic camera shown in FIG. 1.

FIG. 2 shows an example of a photographic film with the brightness information recorded thereon. This photographic film 18 is formed, at regular intervals, with perforations 18b which are detected by a photosensor of a feed stop device (not shown) so as to control feeding the film one frame at a time. Brightness information 30, in the form of a bar code, is recorded on a side opposite each perforation 18b. This bar code is made visible as a result of the development process.

Figure 3:
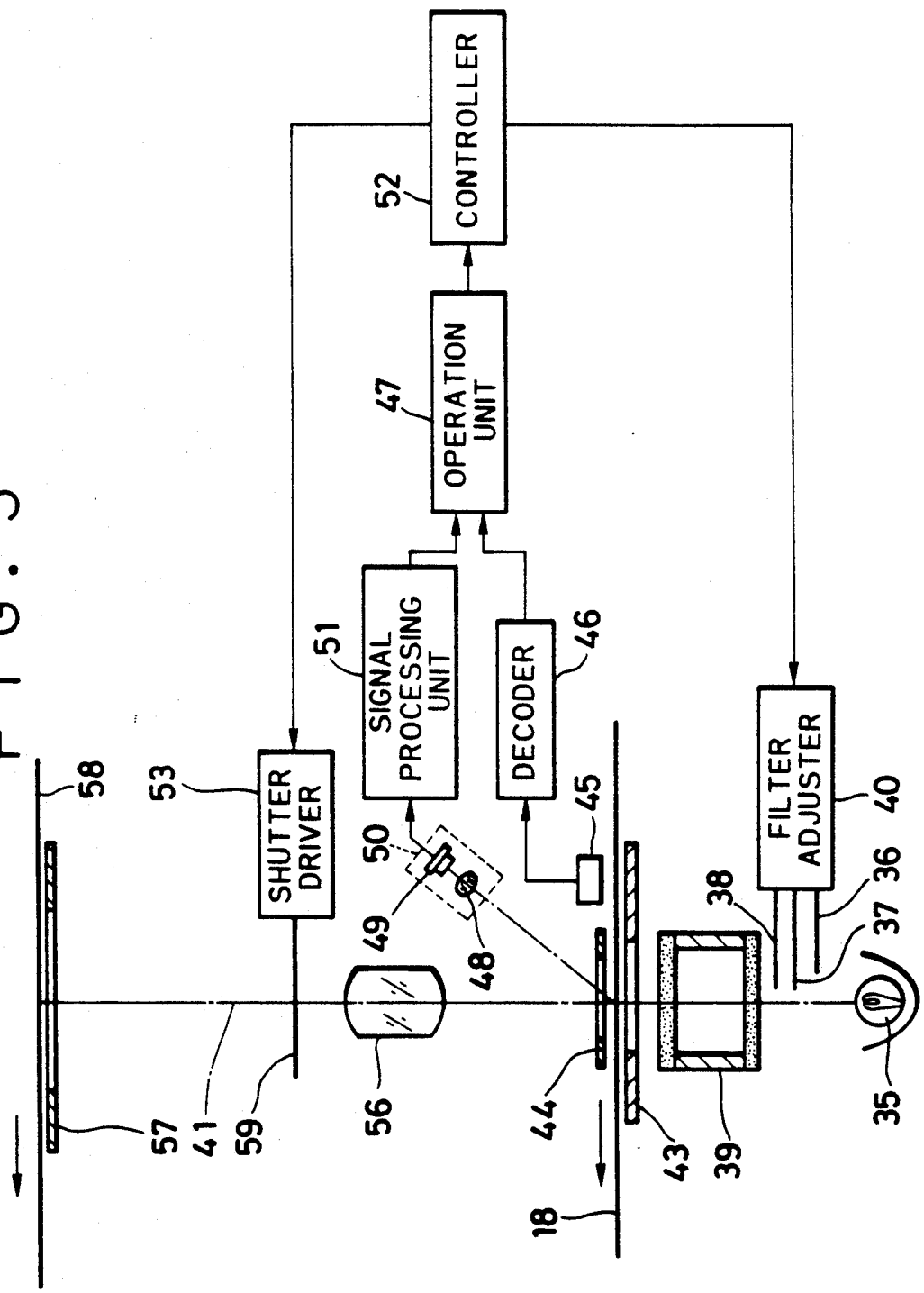
FIG. 3 is a schematic diagram showing an example of a photographic printer embodying the invention.

FIG. 3 illustrates a photographic printer, in which white light radiated from a light source 35 passes through a cyan filter 36, a magenta filter 37, and a yellow filter 38, and enters a mixing box 39. The degree of insertion of these color filters 36, 37, and 38 into an optical path 41 is controlled by a filter adjuster 40 to regulate the three color components and intensities of a printing light. The mixing box 39 is constructed of a rectangular tube having an inner mirror surface and diffusion plates mounted on both opposite ends of the rectangular tube.

A film carrier 43 is set at the printing station. A developed photographic film 18 is set at the printing station, and is illuminated with light transmitted through the mixing box 39. A film mask 4,4, mounted at the printing station to ensure the evenness of the photographic film 18, is formed with an opening corresponding to frame size, as is well known in the art. The film mask 44 is raised by a solenoid (not shown) while the photographic film 18 is being fed, and is lowered to press the photographic film 18 down during printing.

A bar code reader 45 is mounted upstream of the printing station to read the brightness information 30 recorded for the frame while the photographic film 18 is fed to the printing station. The read tightness information is decoded by a decoder 46 and is sent to an operation unit 47 constituted by a microcomputer. A scanner 50, disposed upstream from and above the printing station, is constructed of a lens 48 and an image area sensor 49, and measures the amount of light transmitted through each measurement point of the frame set at the printing station. An output signal from the scanner 50 is sent to a signal processing circuit 51 and subjected to logarithmic and digital conversion. The logarithmically converted density signal at each measurement point is sent to the operation unit 47.

A controller 52 operates to adjust the setting positions of the color correction filters 36, 37, and 38 in accordance with the print exposure amounts of three colors calculated by the operation unit 47. The controller 52 also controls various parts, such as a shutter driver 53 and the like, as well as the filter adjuster 40. A printing lens 56 is disposed above the printing station to enlarge and project an image in the set frame onto a photosensitive material such as a color paper 58 positioned behind a paper mask 57. Between the printing lens 56 and color paper 58 there is disposed a shutter 59 whose open/close operation is controlled by the shutter driver 53.

Figure 4:
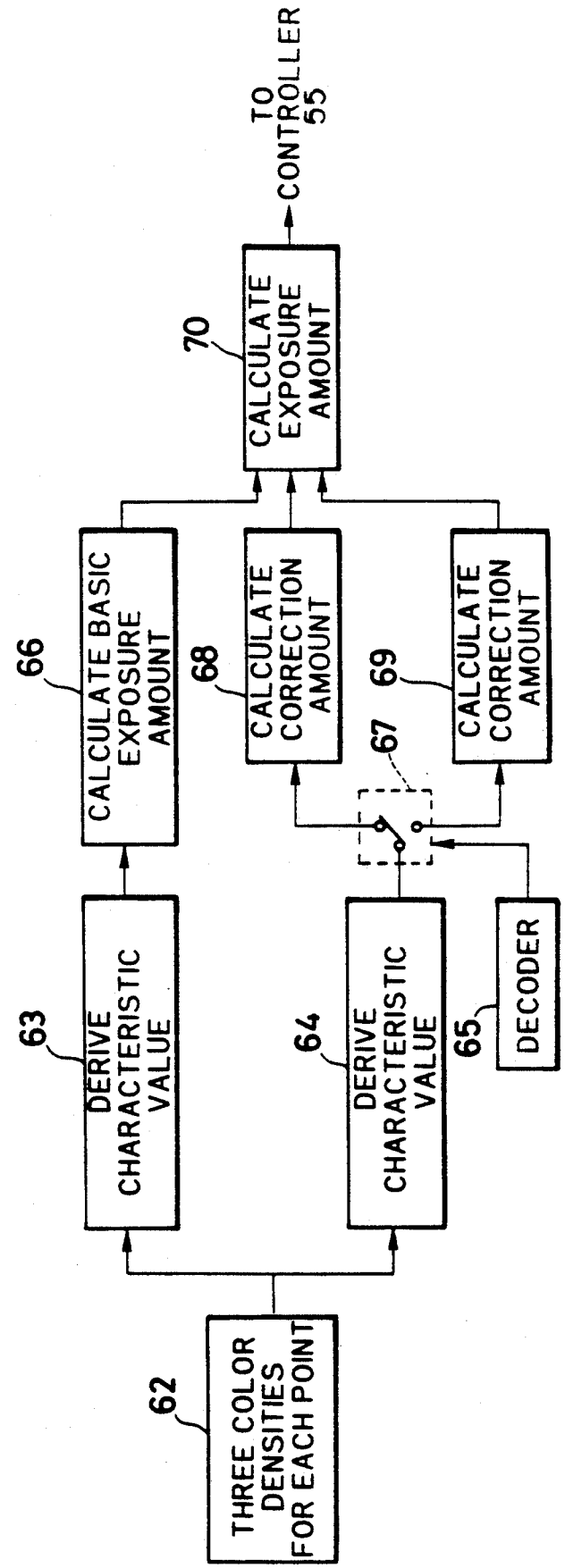
FIG. 4 is a functional block diagram illustrating the function of the operation unit of FIG. 3 for calculating a print exposure amount.

FIG. 4 illustrates the function of the operation unit 47. A memory 62 stores therein three color densities for respective measurement points measured by the scanner 50. The three color densities are sent to characteristic value deriving units 63 and 64 for calculation of print exposure amounts. The characteristic value deriving unit 64 derives characteristic values to be used for calculating a correction amount $\Delta E$, and the characteristic value deriving unit 63 derives characteristic values to be used for calculating, by the LATD method, a basic exposure amount $EG_i$ (i represents one of red, green, and blue colors) which is sent to a calculation unit 66.

A decoder 65 switches a selector 67 in accordance with the brightness information to select one of calculation units 68, 69, the selected calculation unit being used for calculating the correction amount $\Delta E$. The correction amount $\Delta E$ calculated by the selected one of the calculation units 68, 69 is sent to a print exposure amount calculation unit 70 to correct the basic exposure amount $EB_i$ by using the correction amount $\Delta E$ so as to obtain a print exposure amount $E_1$ which is sent to the controller 52.

A plurality of correction amount calculation equations are prepared, and one is selected in accordance with the brightness information. With a photographic film having a photographic sensitivity of ISO 100, many scenes are rear light scenes or snow scenes at a light value (LV) in excess of "12". For such scenes, it is preferable to reduce substantially a print exposure amount. At an LV of "7 to 12", many scenes are scenes with a background such as a white wall. For such scenes, it is preferable to reduce the print exposure amount somewhat. At an LV smaller than "7", many scenes are indoor scenes, scenes with the setting sun, and scenes taken at night. For such scenes, it is preferable to increase a print exposure amount somewhat. In this embodiment of the invention, a different correction amount calculation equation is used for the scene at an LV of "7 to 12" from the equation used for the scene at an LV in excess of "12" to calculate a correction amount to be used for the correction of the basic exposure amount. Examples of a correction amount calculation equation are shown below:

(1) $7 \leq LV \leq 12$
$$\Delta E = KA_0 + KA_1 \cdot Dmx + KA_2 \cdot Dmn + KA_3 \cdot Dm \quad (1)$$

Figure 5A:
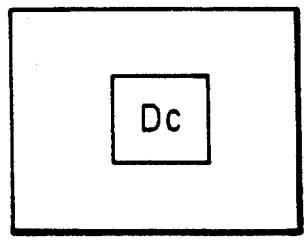
FIGS. 5A to 5C illustrate the relationships among characteristic values and areas from which they are derived.
Figure 5B:
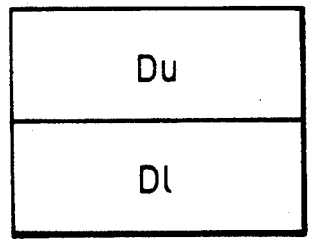

(2) $LV > 12$
$$\Delta E = KB_0 + KB_1 \cdot Dmx + KB_2 \cdot Dmn + KB_3 \cdot Dm + KB_4 \cdot Dc + KB_5 \cdot Dl \quad (2)$$

where
Dmx: a maximum value of grey densities within a frame,
Dmn: a minimum value of grey densities within a frame,
Dm: an average grey density within a frame,
Dc: an average grey density within the central area of a frame as shown in FIG. 5A.
Dl: an average grey density within the lower half area of a frame as shown in FIG. 5B.

In this embodiment, grey densities are used as the characteristic values. The grey densities are obtained, i.e., through calculation of an arithmetic mean of the three color densities. In the embodiment, the coefficients $KA_0$ to $KB_5$ preferably take the following values:

$KA_0 = -4.26$
$KA_1 = 0.03$
$KA_2 = 0.02$
$KA_3 = -0.06$
$KB_0 = -1.20$
$KB_1 = 0.02$
$KB_2 = 0.06$
$KB_3 = -0.14$ $KB_4 = 0.03$ $KB_5 = 0.03$

A basic exposure amount is calculated by using a characteristic value, e.g., an average density, covering a large area such as in the LATD method. The following equation using a characteristic value $D_i$ is known:

$$\log EB_i = \alpha_i(D_i - DN_i) + \beta_i \tag{3}$$

where

α: a slope coefficient.

β: a constant determined by a particular combination of photographic film, color paper, and taking lens.

DN: an average density of control negative film.

D: An average density of frame to be printed.

An optimum print exposure amount $E_i$ is calculated by correcting the basic exposure amount $EB_i$ by the correction amount $\Delta E$. If one step of a density correction key corresponds to 20% of the exposure amount, the following equation is used:

$$E_i = EB_i \cdot (1.20)^{\Delta E} \tag{4}$$

The operation of the just-described embodiment now follows. When taking a photograph, a camera is directed toward a principal object, and a desired layout is determined. Thereafter, a release button is halfdepressed, as is well known in the art. Then, a signal representative of an object luminance measured with the photosensor 21 is sent to the calculating circuit 22. This circuit 22 then calculates a light value (LV) by using the object luminance and photographic sensitivity, the calculated light value being sent to the bar code data generator 23 and drive mechanism 15. Upon further depression of the release button, the drive mechanism 15 causes the movable pin 16 to move reciprocally by an amount corresponding to the light value, thereby to open and close the shutter mechanism 12 to take the object image.

At the same time as or slightly before or after this photographing, the bar code data generator 23 converts the light value used as the brightness information into a bar code which then is sent to the driver 24. The driver 24 drives the bar code recording head 25 to display the brightness information represented by a bar code on the liquid crystal display 26. After the bar code display becomes stable, the flash tube 26 is illuminated to record the brightness information 30 on the peripheral portion of the frame 18a, as shown in FIG. 2.

After photographing objects for all frames of the photographic film 18, the film is picked up from the photographic camera and is sent to a laboratory. At the laboratory, the photographic film 18 is developed to make visible, as latent images, an object image and the brightness information recorded in each frame. The developed photographic film 18 is mounted on the film carrier 43 of the photographic printer shown in FIG. 3 to set a frame to be printed, e.g. frame 18a, to the printing station. Immediately before the frame 18a is fed to the printing station, the bar code reader 45 reads the brightness information 30 recorded at the peripheral portion of the frame 18a. The read brightness information is decoded by the decoder 45 and is sent to the operation unit 47.

When the frame 18a is set at the printing station, the scanner 50 measures the transmitted red, green and blue light amounts for each measurement point. The three color photometric values are converted into the densities (strictly speaking, these are logarithmically converted values of light amounts) by the signal processing circuit 51, and are sent to the operation unit 47. The operation unit 47 calculates the characteristic values Dmx. Dmn. Dm, and so on by using the three color densities for respective measurement points. The calculated characteristic values are substituted into the correction amount calculation equation which is selected in accordance with the brightness information, thereby to calculate the correction amount $\Delta E$.

The operation unit 47 also calculates the average density $D_i$ of the overall area of the frame, that density being substituted into the calculation equation (3) to calculate the basic exposure amount $EB_i$. Next, at the operation unit 47, the basic exposure amount $EB_i$, and the correction amount $\Delta E$ are substituted into the calculation equation (4) to calculate the print exposure amount $E_i$ for each color, the print exposure amount then being sent to the controller 52. The controller 52 adjusts the degree of insertion of the color correction filters 36, 37, and 38 into the optical path 41 in accordance with the print exposure amount $E_i$. After adjusting the filters, the shutter 59 opens for a predetermined time to print the frame 18a on the color paper 58. The other frames of the photographic film 18 are printed sequentially in a similar manner.

In the just-described embodiment, scenes are classified in accordance with the brightness information. The brightness information may be used to select measurement points (pixels). Specifically, the grey density $D_j$ (j representing a position of each measurement point) of each measurement point is measured, and is stored in a memory. An average grey density Dm within a frame is obtained from grey densities $D_j$ of respective measurement points. A difference $\Delta D_j$ between the grey densities $D_j$ and Dm is calculated:

$$\Delta D_j = D_j - Dm$$

This difference $\Delta D_j$ and the light value (LV), obtained through large area photometry of an object and recorded in a photographic film, are substituted in the following equation (5) to estimate a light value $LV_j$ at each measurement point:

$$LV_j = LV + 10^{(\Delta D_j/2)} \tag{5}$$

The brightness of a photographic scene thus can be estimated on the basis of image densities. An area of a frame having a brightness that can be neglected for exposure control. e.g., a very bright area such as sky or snow, is excluded in deriving characteristic values. For example, with a photographic film of ISO 100, measurement points with light values $LV_j$ smaller than "15" are used as effective measurement points. The densities $D_j$ at these effective measurement points are substituted into the following correction amount calculation equation (6) to obtain a correction amount $\Delta E$:

$$\Delta E = KC_0 + KC_1 \cdot Dmx + KC_2 \cdot Dmn + KC_3 \cdot Dm + \\ KC_4 \cdot Dc + KC_5 \cdot Dl + KC_6 \cdot Du + KC_7 \cdot Dri + KC_8 \cdot Dle \tag{6}$$

where

Figure 5C:
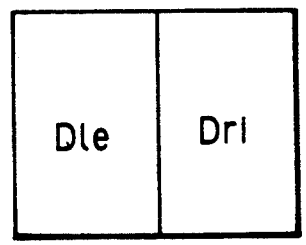

Du: an average grey density within the upper half of a frame as shown in FIG. 5B, Dri: an average grey density within the right half of a frame as shown in FIG. 5C, Dle: an average grey density within the left half of a frame as shown in FIG. 5C.

In this embodiment, the coefficients preferably take the following values:

$KC_0 = 0.40$
$KC_1 = 0.04$
$KC_2 = 0.02$
$KC_3 = 0.10$
$KC_4 = 0.03$
$KC_5 = 0.03$
$KC_6 = -0.03$
$KC_7 = 0.02$
$KC_8 = 0.03$

Scenes may be classified in accordance with the maximum value (LVmx) of estimated light values ($LV_j$) to calculate the correction amount by busing one of the following correction amount calculation equations (7) or (8) prepared for the classified scene. In particular, (1) $LVmx \geq 15$
$$\Delta E = KD_0 + KD_1 \cdot Dmx + KD_2 \cdot Dmn + KD_3 \cdot Dm + KD_4 \cdot Dc + KD_5 \cdot Dl + KD_6 \cdot Dle \quad (7)$$

The coefficients of this equation (7) may take the following values:

$KD_0 = -1.69$
$KD_1 = 0.02$
$KD_2 = 0.03$
$KD_3 = 0.14$
$KD_4 = 0.04$
$KD_5 = 0.06$
$KD_6 = -0.03$ (2) $LVmx < 15$
$$\Delta E = KE_0 + KE_1 \cdot Dmx + KE_2 \cdot Dmn + KE_3 \cdot Dm + KE_4 \cdot Dc + KE_5 \cdot Dl + KE_6 \cdot Du + KE_7 \cdot Dle \quad (8)$$

The coefficients of this equation (8) may take the following values:

$KE_0 = 0.24$
$KE_1 = 0.04$
$KE_2 = 0.03$
$KE_3 = -0.09$
$KE_4 = 0.04$
$KE_5 = 0.03$
$KE_6 = -0.03$
$KE_7 = -0.04$

Figure 7:
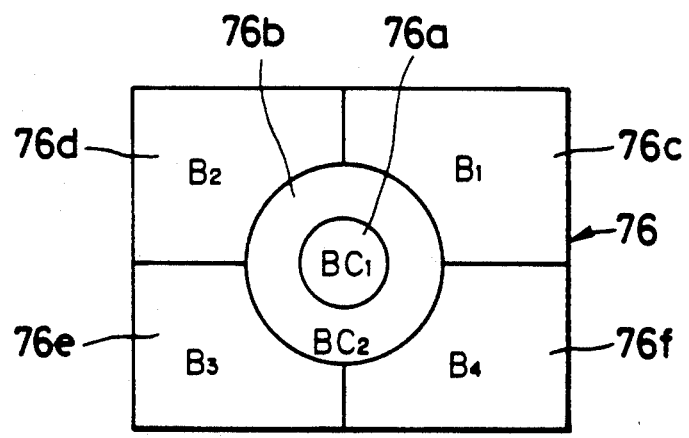
FIG. 7 illustrates in greater detail the photosensor shown in FIG. 6.

FIG. 6 shows a photographic camera which records classification information of a photographic scene. Elements which are the same as those shown in FIG. 1 are represented by identical reference numerals. In this embodiment, a photosensor 76 is disposed behind a lens 75 in order to measure the brightness of an object at divisional areas. As shown in FIG. 7, this photosensor 76 is constructed of six sensor elements 76a, 76b, 76c, 76d, 76e, and 76f, so that the brightness of an object is measured at a plurality of divisional areas. The sensor element 76a measures the brightness of the central area of a frame, and the sensor element 76b measures the area around the central area. The sensor elements 76c, 76d, 76e, and 76f measure the brightness of peripheral divided areas.

Signals from the sensor elements 76a to 76f are sent to a scene discriminating circuit 77 and a calculating circuit 79 to determine an exposure amount. The scene discriminating circuit 77 discriminates the classification of a photographic scene in accordance with the photometric values at respective areas. In this embodiment scenes are classified into three types including a rear light photographic scene, a standard photographic scene and a photographic scene with a dark background, as follows:

(a) Rear Light Photographic Scene

A photographic scene satisfying both of the following conditional formulas (9) and (10) is regarded as a rear light photographic scene:

$$BC_1 \text{ or } BC_2 < \tfrac{1}{4} \cdot (B_1 + B_2 + B_3 + B_4) \quad (9)$$

$$7 \cdot BV < \tfrac{1}{4} \cdot (B_1 + B_2 + B_3 + B_4) \quad (10)$$

where
$BC_1$: a luminance value measured with sensor element 76a,
$BC_2$: a luminance value measured with sensor element 76b,
$B_1$: a luminance value measured with sensor element 76c,
$B_2$: a luminance value measured with sensor element 76d,
$B_3$: a luminance value measured with sensor element 76e,
$B_4$: a luminance value measured with sensor element 76f,
BV: a luminance value of an object.

(b) Photographic Scene with Dark Background

A scene satisfying the following conditional formulas (11) and (12) is regarded as a photographic scene with a dark background.

$$BC_1 \text{ or } BC_2 > 5\,BV \quad (11)$$

$$Bmn < 2 \cdot BV \quad (12)$$

where Bmn is a minimum brightness.

(c) Standard Photographic Scene

Scenes other than those in (a) and (b) are regarded as standard photographic scenes.

The scene classification information outputted from the scene discriminating circuit 77 is converted into bar code data by the bar code data generator 78 and is sent to the bar code recording head 25 via the driver 24 to record the classification information represented by a bar code on a photographic film 18 in a similar manner as described previously. While classification information has been shown as recorded in bar code form in the foregoing embodiments, symbols, numerals, characters or the like also may be used. A mark to be recorded with a light emitting diode or the like may be recorded at the area shifted by an amount corresponding to the type of a photographic scene.

The calculating circuit 79 calculates the object luminance value to be used for the exposure control in accordance with the measured values at respective areas. By using this object luminance and photographic sensitivity, a light value (LV) is calculated to programcontrol the shutter 12, as described previously. The luminance value B to be used for the exposure control may be calculated by the following equation (13):

$$B = KF_1 BC_1 + KF_2 \cdot BC_2 + KF_3 B_1 + KF_4 \cdot B_2 + KF_5 \cdot B_3 + KF_6 \cdot B_4 \quad (13)$$

where $KF_1$ to $KF_6$ are weighting coefficients.

In this embodiment, for a printing operation, the scene classification information recorded in a photographic film 18 at the time of photographing is read so that the type of scene of a frame to be printed can be identified immediately. Thereafter, a correction amount calculation equation prepared for each type of scene, as shown in FIG. 4, is selected to calculate a correction amount $\Delta E$. Examples of correction amount calculation equations to be used with this embodiment are shown below:

(a) Rear Light Photographic Scene
$$\Delta E = KG_0 + KG_1 \cdot Dmx + KG_2 \cdot KG_3 \cdot Dm + KG_4 \cdot Dc + KG_5 \cdot Dl \quad (14)$$

The coefficients $KG_0$ to $KG_5$ may take the following values:
$KG_0 = -1.20$
$KG_1 = 0.20$
$KG_2 = 0.06$
$KG_3 = -0.14$
$KG_4 = 0.03$
$KG_5 = 0.03$ (b) Photographic Scene with Dark Background
$$\Delta E = KH_0 + KH_1 \cdot Dmx + KH_2 \cdot Dmn + KH_3 \cdot Dm + KH_4 \cdot Dc + KH_5 \cdot Du\, KH_6 \cdot Dri \quad (15)$$

The coefficients $KH_0$ to $KH_6$ may take the following values:
$KH_0 = 1.07$
$KH_1 = 0.04$
$KH_2 = 0.03$
$KH_3 = -0.11$
$KH_4 = 0.03$
$KH_5 = -0.06$
$KH_6 = 0.03$ (c) Standard Photographic Scene
$$\Delta E = KI_0 + KI_1 \cdot Dmx + KI_2 \cdot Dmn + KI_3 \cdot Dm + KI_4 \cdot Dc + KI_5 \cdot Dl + KI_6 \cdot Du + KI_7 \cdot Dri + KI_8 \cdot Dle \quad (16)$$

The coefficients $KI_0$ to $KI_8$ may take the following values:
$KI_0 = 0.40$
$KI_1 = 0.04$
$KI_2 = 0.02$
$KI_3 = -0.10$
$KI_4 = 0.03$
$KI_5 = 0.03$
$KI_6 - 0.03$
$KI_7 = 0.02$
$KI_8 = -0.03$ As described previously, the basic exposure value $EB_i$ is obtained by using the calculation equation (3). and the print exposure amount $E_i$ is obtained by substituting the correction amount $\Delta E$ and basic exposure amount $EB_i$ into the calculation equation (4). In accordance with the print exposure amount $E_i$, the setting positions of the color correction filters 36 to 38 are adjusted to control the exposure amounts of the three colors.

Instead of discriminating scenes on the basis of divisional area photometry as in the above embodiment, an exposure correction amount used by a photographic camera may be recorded in a photographic film. As the exposure correction amount, an exposure value (EV) or luminance value (BV) also may be used in place of the light value (LV). If the luminance value is used, a luminance difference $\Delta B$ is obtained, using the following equation (17). and recorded on photographic film.

$$\Delta B = B - Bm \quad (17)$$

where Bm is an average value of luminance values at respective measurement points, namely, $$Bm = (BC_1 + BC_2 + B_1 + B_2 + B_3 + B_4)/6 \quad (18)$$

For the printing operation, the luminance difference $\Delta B$ is read from the photographic film. The read luminance difference $\Delta B$ and a coefficient KJ are substituted into the following equation (19) to calculate the correction amount $\Delta E$, which is used to correct the basic exposure amount $E_i$.

$$\Delta E = KJ \cdot \Delta B \quad (19)$$

Figure 8:
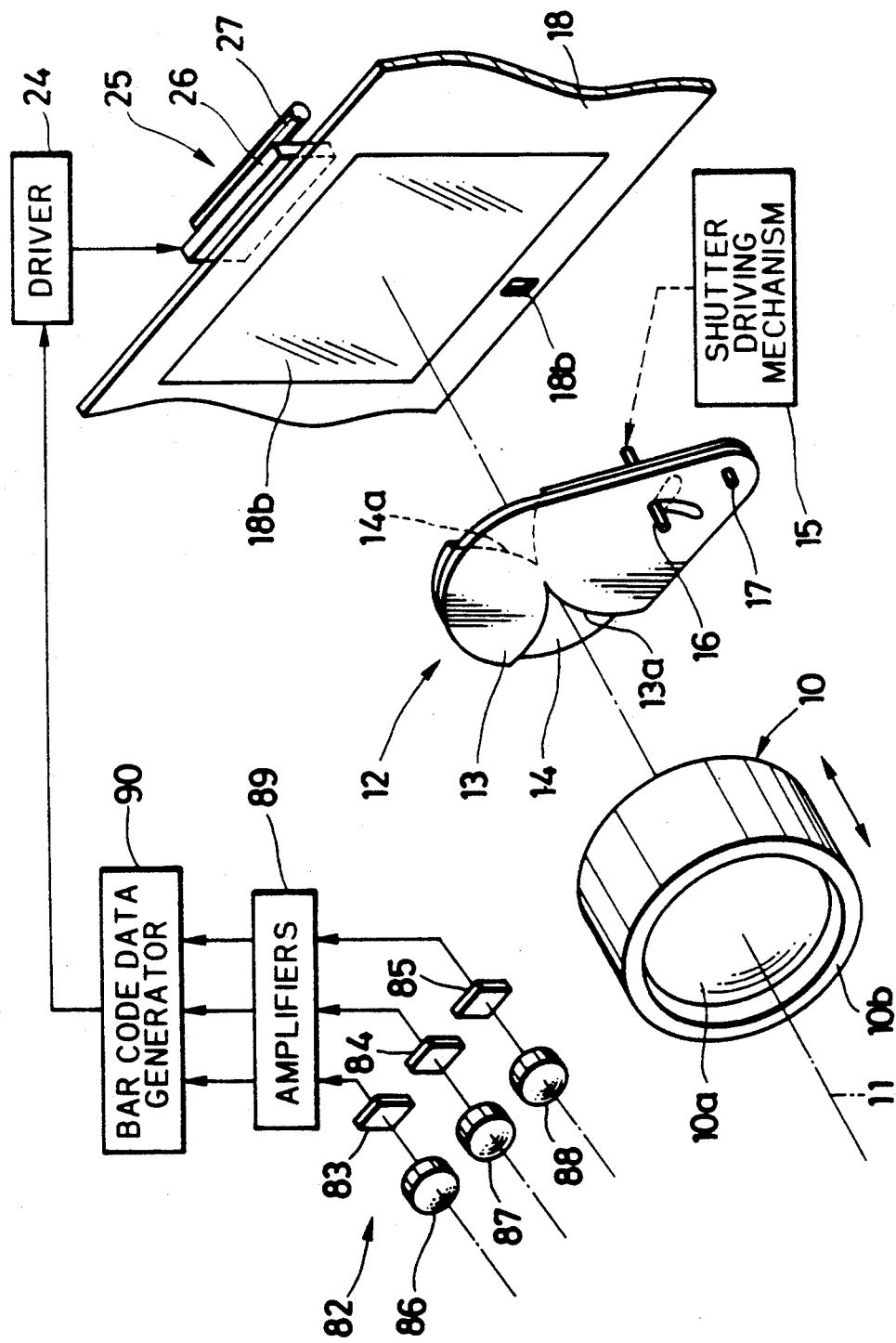
FIG. 8 is a schematic diagram showing a photographic camera which records average color information of an object.

FIG. 8 shows an embodiment of a photographic camera which records color information of a scene. Elements which are the same as those shown in FIG. 1 are represented by identical reference numerals. A colorimetric unit 82 measures the three color components (red, green, and blue) of object light to obtain an average color of the object. By setting the angle of incident light to the colorimetric unit 82 appropriately, all or a part, e.g. the central part, of an object can be measured. The colorimetric unit 82 is constructed of a red color sensor 83 for photoelectrically converting red light into an electric signal, a green color sensor 84 for the photoelectric conversion of green light, and a blue color sensor 85 for the photoelectric conversion of blue light. Lenses 86, 87, and 88 are disposed in front of the sensors 83, 84, and 85, respectively. As is well known, the color sensors 83. 84 and 85 are mounted with filters at their light receiving surfaces having colors corresponding to their light to be measured.

The color sensors 83, 84, and 85 preferably have the same spectral sensitivity as that of human eyes (such as a tristimulus value curve). With such an arrangement, an object illuminated with an artificial light source such as a fluorescent lamp, tungsten lamp or the like can be printed to have the same color as actually observed with human eyes. The outputs of the color sensors 83, 84, and 85 are amplified by amplifiers 89 and are sent to a bar code data generator 90 to be converted into bar code data. The bar code data are sent via a driver 30 to a bar code recording head 25 to record bar codes in a photographic film 18, as described before. FIG. 9 shows an example of a photographic film recorded with bar codes. Red colorimetric data 92, green colorimetric data 93, and blue colorimetric data 94, represented by respective bar codes, are recorded in an area near the frame 18c of the photographic film 18.

As described previously, a developed photographic film 18 is set in the photographic printer shown in FIG. 3 to print an object image. For the printing operation, the colorimetric data 92, 93, and 94 are read with the bar code reader 45, and the densities at respective measurement points are measured with the scanner 50. In this embodiment, the colorimetric data 92, 93, and 94 are used to calculate the three color print exposure amounts, in accordance with which the average color of a finished print becomes the same as that of an object.

The print exposure amount $E_i$ is calculated by using the following print exposure amount calculation equation (20), for example:

$$\log E_i = (K1_i + K2_i) + K3_i \cdot (D_i - DN_i) \quad (20)$$

where
- K1: an exposure amount required for properly printing a normal control negative film.
- K2: a correction amount obtained from colorimetric data.
- K3: a slope value.

The correction value K2 is used to correct the color of a scene. For example, for a scene with an image of the sea, the print exposure amount is determined such that the three color average value of the photoprint is the same blue color of the scene. Conventionally, this correction value K2 has not been used. A conventional print exposure amount calculation equation would be obtained by substituting "0" for K2 in the calculation equation (20).

$$K2_i = F(SC_i - NC_i) \quad (21)$$

where
- SC: color of a scene obtained from the three color colorimetric data.
- NC: color of a scene corresponding to that on a normal control negative film.

The function F of the colorimetric equation (21) converts the three color colorimetric data of a scene into a printing density difference. For example, the function may use the color differences of two colors from a green color as follows:

$$K2_i = (\log L_i - \log L_G) - (\log LN_i - \log LN_G) \quad (22)$$

where
- $L_i$: three color colorimetric data.
- $L_G$: green colorimetric data.
- $LN_i$: colorimetric data for a scene corresponding to that on a normal control negative film (this takes a constant value such as, usually, a grey color or average data for a plurality of scenes).
- $LN_G$: green colorimetric data for a scene corresponding to that on a normal control negative film (this takes a constant value such as, usually, a grey color or average data for a plurality of scenes).

The print exposure amount $E_i$ is calculated by using the equations (20) and (22) in accordance with the color information of a scene.

The following print exposure calculation equations also may be used:

$$\log E_i = K1_i + K2_i \cdot (D_i - D_n) \quad (23)$$

where $Dn_i$ is a value given by:

$$DN_i = DN_i + G(SC_i - NC_i) \quad (24)$$

The function G in equation (24) may use the color differences of two colors from a green color, as in equation (22), as colors. With a conventional print exposure amount calculation equation, a scene with an image of the sea, for example, has a density $D_B$ which is larger than either of the densities $D_R$ and $D_G$. As a result, the print exposure amount $E_B$ for a blue color would become large, and the scene of the sea would be printed to be grey. Therefore, it is necessary to correct the blue color print exposure amount $E_B$ to be smaller. In this embodiment, the density $Dn_i$ is the same as that of the color in the scene of the sea and the correction to print it to be grey is not effected, thereby reproducing the blue colored sea.

Figure 10:
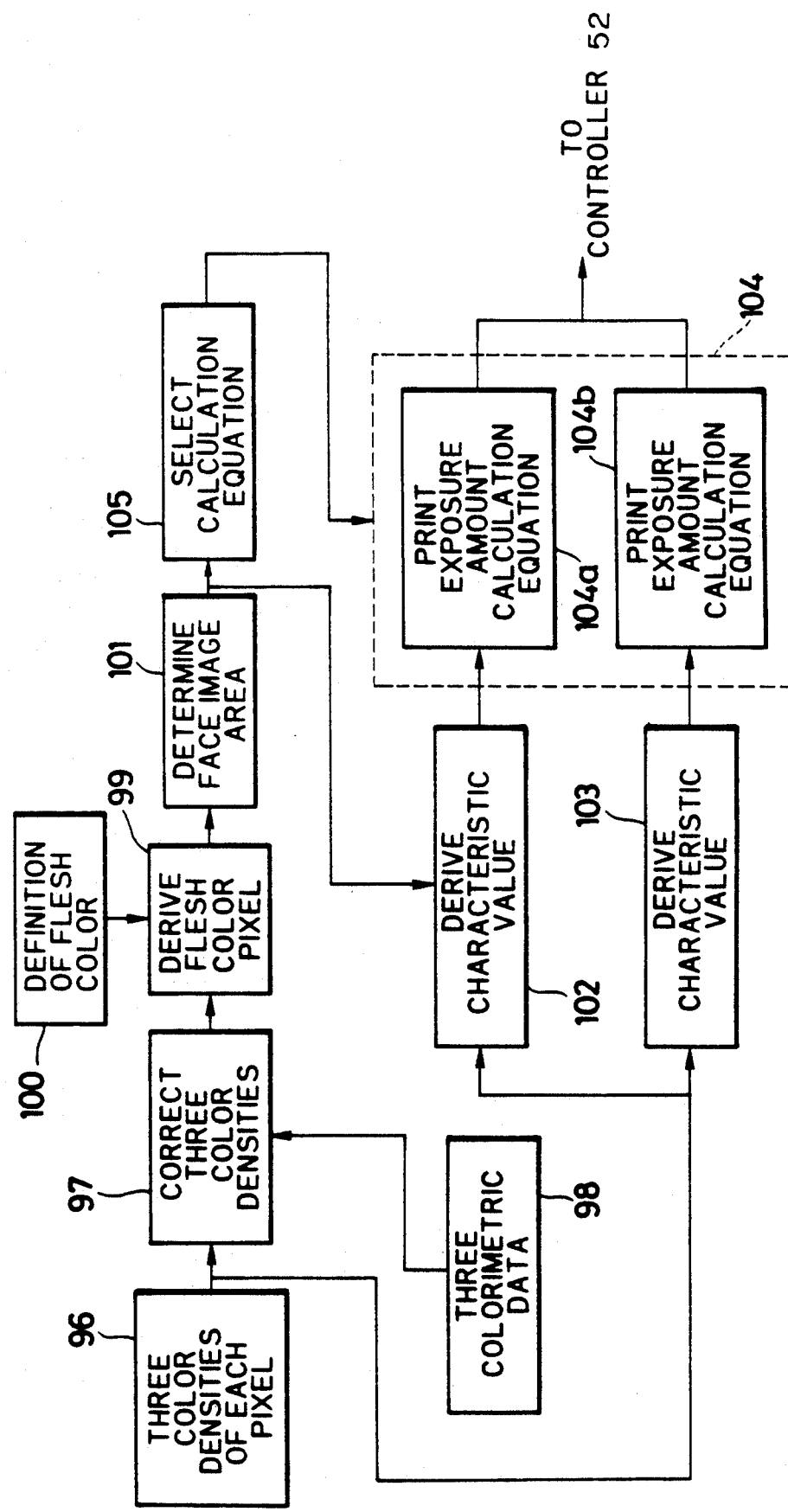
FIG. 10 is a functional block diagram illustrating the function of the operation unit of FIG. 3 used with the flesh color controlling embodiment of the invention.

Pixels of a photographic film change their color with the type of the photographic film, and with a main illuminating light source. This change can be corrected by using the three color colorimetric data $L_i$. FIG. 10 is a functional block diagram illustrating the function of the operation unit 47, in a similar manner to that shown in FIG. 4, for effecting such color correction. A memory 96 stores therein a three color density $f_{ij}$ (j represents the number of a measurement point) at each measurement point (pixel) within a frame. The three color density $f_{ij}$ is read when calculating an exposure amount, and is sent to a color density correction calculation unit 97. The color density correction unit 97 uses the following equation (25) to calculate a corrected three color density $DF_{ij}$ by using the three color colorimetric data $L_i$, read by the bar code reader 45 and stored in a memory 98, and the average three color density $F_i$ within the frame 18c. The average density $F_i$ for each color corresponds to the same area as the colorimetric area used by the color sensors 83, 84, and 85. For example, if the three color colorimetric data $L_i$ are obtained from the whole area of the frame 18c, then the average three color density $F_i$ is obtained from the whole area of the frame 18c.

$$Df_{ij} = (F_i - L_i) + f_{ij} \quad (25)$$

The corrected three color density $Df_{ij}$ is sent to a flesh color pixel deriving unit 99 to derive flesh color pixels. In deriving flesh color pixels, data defining a flesh color area stored in a memory 100 is referred to. A flesh color may be defined by an ellipse within the rectangular coordinates having the axes of density differences (R−G) and (G−B). Pixels within the ellipse are regarded as flesh color pixels. The flesh color area may be defined by a rectangle rhombus or the like, in addition to the ellipse.

A facial area determining unit 101 judges a closed area composed of flesh color pixels as a facial image area and determines the position of flesh color pixels. The position coordinate values of the facial image area are sent to a characteristic value deriving unit 102 to derive the characteristic values for the calculation equation which calculates a print exposure amount by emphasizing the face image area. Specifically, the characteristic value deriving unit 102 reads the color densities of pixels within the facial image area and calculates the average value thereof. The characteristic value deriving unit 103 calculates the maximum and minimum values of the color densities, or an average density of a particular area such as the central area or peripheral area within the frame.

The obtained characteristic values are sent to a calculation unit 104 and are substituted into a print exposure amount calculation equation 104a emphasizing a flesh color. Another characteristic value deriving unit 103 derives characteristic values for a general print exposure amount calculation equation 104b. Examples of these print exposure amount calculation equations are detailed. e.g. in Japanese Patent Laid-open Publication No. 62-189456. A calculation equation selecting unit 105 selects the print exposure amount calculation equation 104a when a facial image area is present within the frame 18c, and the print exposure amount calculation equation 104b when a facial image area is not present, thereby to calculate the print exposure amount $E_i$.

The color of an image taken in a photographic film becomes different even for the same object depending upon the film type (sensitivity, gamma, base density) as described previously. Conventionally, it has been necessary to control the exposure amount by judging whether the color of an image is the same as that of an object, or whether it has been influenced by the color of a light source or by the film type. According to the invention, the color of all or a part of a photographic scene is recorded. Therefore, without considering the cause of change in color density, it is possible to make a photoprint having a proper color balance by finishing it in a preferable color which is the same as or similar to the object color defined by the three color colorimetric data. The print exposure amount $E_i$ can be obtained from the three color colorimetric data $L_i$ with reference to a table which had addresses (log $L_i$ − log $L_G$) and data log $E_i$. Needless to say, such a table is formed by taking into consideration the sensitivity change and development performance change of a color paper.

The embodiments of the invention shown in FIGS. 1 to 6 which use the brightness information may be modified or changed as follows. Color correction may be performed using brightness information. The brightness information may be used to determine a basic exposure amount. The brightness information may be obtained not only through large area averaging photometry, but also through spot photometry, or multi-point photometry using an image sensor. In the case of multi-point photometry, the brightness information for respective measurement points is used per se. With an automatic focussing camera, the position of a principal object whose distance is to be measured may be recorded to discriminate a scene or derive effective measurement points in accordance with the brightness of the principal object. Further, although the print exposure amount calculation equation is selected in accordance with the discriminated scene, the correction amount may be determined beforehand for each scene classification.

In the above embodiments, the information is recorded in a photographic film in the form of a bar code. However, instead of a bar code, optical marks, characters, numerals, or the like also may be used. If an optical mark is used, a code "0" or "1" preferably is used which represents the absence of presence of the optical code. Such a code may be recorded in a photographic film by using a light emitting diode, for example. The print exposure amount may be determined by using both the brightness information and color information. Further, information indicating a presence/absence of flash information indicating the posture (holding angle) of a photographic camera, or other information also may be recorded. Such information may be recorded in an IC card mounted on a camera, in a magnetic recording area provided at the outer periphery of a film patron, or in other recording media.

This invention also is applicable to a video still camera. With a video still camera, the information at the time of taking an image is written together with the image data to a memory such as magnetic floppy disk, and the information is used to print the image on a color paper or the like as a hard copy thereof.

While the invention has been described in detail above with reference to a preferred embodiment, various modifications within the scope and spirit of the invention will be apparent to people of working skill in this technological field. Thus the invention should be considered as limited only by the scope of the appended claims.

What is claimed is:

1. A method of determining a print exposure amount to be used for printing an image of an object on a photosensitive material, said method comprising the steps of:

reading average brightness information of said object from a recording medium, said average brightness information having been recorded in said recording medium when taking said object image;

measuring respective points of said object image to obtain photometric values;

converting the photometric values into brightness information by considering said average brightness information;

judging as effective pixels such points among said respective points as have the brightness information within a predetermined range; and obtaining a characteristic value for calculating said print exposure amount from photometric values of said effective pixels.

2. A method according to claim 1, wherein said recording medium is a photographic film, and said average brightness information is recorded in an area of said film near said object image.

3. A method according to claim 2, wherein said average brightness information is recorded on said film in the form of a bar code.

4. A method of determining a print exposure amount to be used for printing an image of an object on a photosensitive material said method comprising the steps of:

reading average brightness information of said object from a recording medium, said average brightness information having been recorded in said recording medium when taking said object image;

measuring respective points of said object image to obtain photometric values;

converting the photometric values into brightness information by considering said average brightness information;

discriminating a type of a scene in accordance with a maximum value derived from values included in said brightness information at said respective points; and calculating said print exposure amount by selecting, in accordance with said discriminated scene type, one of a plurality of calculation algorithms prepared for respective types of said scene.

5. A method according to claim 4, wherein said recording medium is a photographic film, and said average brightness information is recorded in an area of said film near said object image.

6. A method according to claim 5 wherein said average brightness information is recorded on said film in the form of a bar code.

7. A method of determining a print exposure amount to be used for printing an image of an object on a photosensitive material, said method comprising the steps of:

reading information representative of a type of a scene from a recording medium, said scene type information having been recorded in said recording medium on the basis of the distribution state of brightness obtained by subjecting said object to photometry at divisional areas of said object when taking said object image; and calculating said print exposure amount by selecting, in accordance with said read scene type, one of a plurality of calculation algorithms prepared for respective types of said scene.

8. A method according to claim 7, wherein said recording medium is a photographic film, and said scene type information is recorded in an area of said film near said object image.

9. A method of determining a print exposure amount to be used for printing an image of an object on a photosensitive material, said method comprising the steps of:
reading information representative of a difference between an average luminance of said object and a luminance used for exposure control, said luminance difference information having been recorded in a recording medium when taking said object image; and
calculating said print exposure amount by using said read luminance difference information.

10. A method according to claim 9, wherein said recording medium is a photographic film, and said luminance difference information is recorded in an area of said film near said object image.

11. A method of determining a print exposure amount to be used for printing an image of an object on a photosensitive material, said method comprising the steps of:
reading color information of all or a part of said object from a recording medium, said color information having been recorded in said recording medium when taking said object image, wherein said color information includes red color colorimetric data, green color colorimetric data, and blue color colorimetric data; and
calculating said print exposure amount by using said read color information, wherein said print exposure amount is determined such that a portion of said object, and a portion corresponding to said portion on a reproduced image printed on said photosensitive material, are to be the same color.

12. A method according to claim 11, wherein said recording medium is a photographic film, and said color information is recorded in an area of said film near said object image.

13. A method according to claim 12, wherein the color of said object image at each measurement point is corrected by using said color information.

14. A method according to claim 13, further comprising the steps of:
deriving measurement points having a flesh color on a positive image from said corrected measurement points;
judging, as a facial image, a closed area containing said flesh color measurement points: and
determining said print exposure amount for a figure scene included in said facial image such that said facial image is printed with natural flesh color.

15. An apparatus for taking a picture of a scene, comprising:
a photosensor for subjecting an object to photometry at divisional areas, said photosensor having a plurality of sensor elements;
means for discriminating the type of said scene by comparing photometry signals from said plurality of sensor elements; and
means for recording information representative of said discriminated type of said scene in a recording medium.

16. An apparatus according to claim 15, wherein said recording medium is a photographic film, and said information is recorded in an area near a frame of said film within which said scene is recorded.

17. An apparatus for taking a scene, comprising;
a photosensor for subjecting an object to photometry at divisional areas, said photosensor having a plurality of sensor elements;
means for obtaining a difference between a luminance for use with exposure control and an average luminance of said scene in accordance with output signals from said sensor elements: and
means for recording information of said luminance difference in a recording medium.

18. An apparatus according to claim 17, wherein said recording medium is a photographic film, and said luminance difference information is recorded in an area near a frame of said film within which said scene is recorded.

19. An apparatus for taking a picture of a scene, comprising:
a colorimetric unit for measuring the color of all or part of an object; and
means for recording information of said measured color in a recording medium.

20. An apparatus according to claim 19, wherein said recording medium is a photographic film, and said color information is recorded in an area near a frame of said film within which said scene is recorded.

21. An apparatus according to claim 20, wherein said colorimetric unit comprises a red color sensor for measuring red light, a green color sensor for measuring green light, and a blue color sensor for measuring blue light.

* * * * *